Jan. 9, 1962     H. M. SOLLARS     3,016,044
ANIMAL FOUNTAIN
Filed Jan. 28, 1960
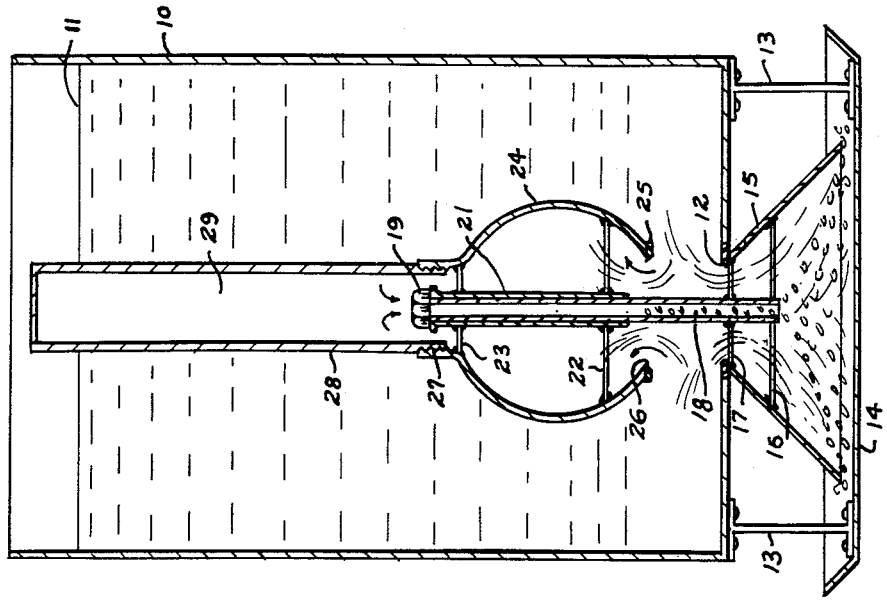
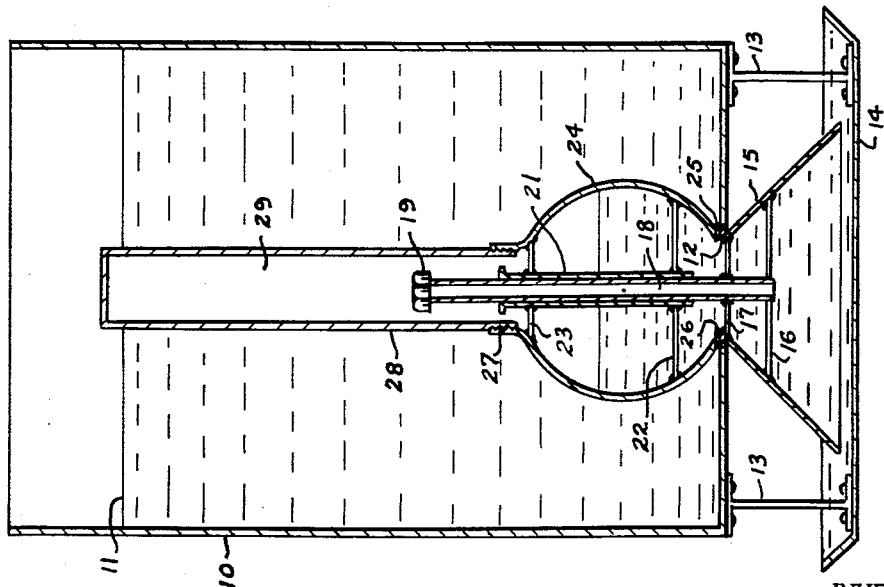
INVENTOR.
HERBERT M. SOLLARS
BY Tom Walker
ATTORNEY

United States Patent Office 3,016,044
Patented Jan. 9, 1962

3,016,044
ANIMAL FOUNTAIN
Herbert M. Sollars, 609 S. Main St., Washington
Court House, Ohio
Filed Jan. 28, 1960, Ser. No. 5,202
10 Claims. (Cl. 119—80)

This invention relates to automatic replenishing means in a device offering an expendable fluid, the invention having especial although not limited reference to farm appliances particularly fountains for animal use offering drinking water or food or a food supplement in liquid form.

Devices of the kind described comprise a serving tray or trough, a storage tank and valve means operable to replenish as needed the supply in the serving tray from the storage tank.

The instant invention has in view a generally new device of the kind described comprising a unitary self-replenishing fountain having a construction particularly characterized by simplicity and reliability of operation.

The object of the invention is to simplify the construction as well as the means and mode of operation of fountain devices whereby such devices may not only be economically manufactured, but will be more efficient and satisfactory in use, adaptable to a wide variety of applications, and be unlikely to get out of order.

Another object of the invention is to provide a device of the kind described characterized by an automatic valve mechanism operating in response to a changing level in the serving tray.

A further object of the invention is to utilize flotation means in the storage tank operating in response to buoyancy variations and independently of the liquid level in the storage tank while such level is within usable limits.

Still another object of the invention is to present a new valve mechanism operable in a device of the kind described automatically to dispense uniform quantities of a stored liquid.

A further object of the invention is to provide a fountain possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view in longitudinal section, and partly diagrammatic of an animal fountain constituting an illustrative embodiment of the invention; and FIG. 2 is a view like FIG. 1 showing the valve mechanism interposed between the storage tank and the serving tray in an elevated or open position.

Like parts are indicated by similar characters of reference throughout the several views.

As noted, while the invention is deemed to have a wide application to liquid dispensing and supply systems it is here illustratively embodied in an animal fountain. As shown, such a fountain may comprise a storage tank 10 open or suitably vented at its upper end. The tank 10 holds a body 11 of a liquid or liquid-like material, for example drinking water or a saturated food in a liquid-like flowable consistency. In the bottom of the tank 10 is a centrally positioned opening 12 serving as an outlet through which portions of the liquid body 11 are dispensed. Beneath the storage tank 10, and suspended therefrom by brackets 13, is a serving tray 14 in this instance in the form of a pan having an upturned peripheral edge whereby to serve as a receptacle for the dispensed liquid material and open at its top to easy access for drinking. The bottom of the tray or receptacle 14 is flat whereby it may serve as a base to support the fountain device on the ground or on a floor surface.

Fastened to the underside of the tank 10 in concentric relation to the outlet 12 is an outlet extension 15. The extension 15 has a continuous circular configuration and flares outwardly to assume a frusto-conical shape from top to bottom. The upper or apex end of the extension is open and has a diameter approximately coincident with the diameter of outlet 12. The base end of the extension projects downwardly to lie in spaced relation to the bottom of receptacle 14 and beneath the plane of the peripheral edge of the receptacle.

The extension 15 has installed therein laterally extending wires or spider formations 16 and 17 which provide a mounting for a tube 18 disposed longitudinally of the tank 10 in concentric relation to outlet 12. The tube 18 projects through and beyond the outlet 12 at its both ends, the lower end of the tube terminating within the space enclosed by outlet extension 15 at a point intermediate the apex and base ends thereof. The other or upper end of the tube 18 terminates in a relatively elevated position within the tank 10 and has externally mounted thereon a nut 19. The latter serves as an abutment defining an upper limit of movement for a sleeve 21 slidably mounted on the tube 18 within the tank 10. The sleeve 21 provides a mounting, through spider formations 22 and 23, for a bulbous part 24. On the lower end of the part 24 is a valve 25 adapted to seat on or in the outlet 12 to close such outlet from communication with the interior of the tank 10 proper, the lower end of the part 24 having an opening 26 registering with the outlet 12 and placing the interior of the bulbous part into communication with the outlet in the closed position of the valve. The upper end of the bulbous part 24 is formed with an internally threaded opening 27 receiving one end of an upright cylindrical member 28. The member 28 extends upwardly into the tank 10 and the upper end thereof is closed. The lower end or that end received in opening 27 is open, the construction and arrangement of parts being such as to define a chamber 29 closed except at its lower end where it is in free communication with the interior of part 24. The tube 18 projects at its upper end upwardly and substantially into the lower end of cylinder 28 in a manner to vent the chamber 29 to the described point enclosed by the outlet extension 15.

The assembly comprising bulbous part 24, cylinder 28 and their supporting sleeve 21 together with valve 25 forms a float or flotation member the buoyancy of which is affected by the presence or absence of liquid in the bulbous part 24. Without liquid therein the flotation member has a maximum buoyancy enabling it to rise in the contained body 11 within the tank 10. This motion is guided by the tube 18 to occur coaxially of the outlet 12 and its extent is limited by the nut 19, the parts assuming under this condition a position substantially as shown in FIG. 2. So elevated, the flotation member is open through the opening 26 for the admission of liquid from the body 11 and an inflow of liquid into the part 24 occurs. In response thereto the flotation member suffers a loss of buoyancy and is constrained to sink in the liquid body 11, sliding downward on the tube 18 until the valve 25 engages the outlet 12. At this point communication of the interior of part 24 with the interior of tank 10 proper is discontinued, the parts assuming a position substantially as shown in FIG. 1. In its elevated position the flotation member likewise opens flow from the tank 10 through outlet 12 into receptacle 14. This flow also is interrupted as the flotation member returns to a seated position on outlet 12.

With liquid present in the part 24 the flotation member remains in a seated or closed position, as shown in FIG. 1, as long as the level of liquid in receptacle 14 remains above the plane of the bottom of extension 15. As the liquid in the receptacle is consumed, evaporated or otherwise expended the level thereof drops, and, as it falls below the described plane of the lower end of extension 15, opens such extension and the communicating interior of bulbous part 24 to the atmosphere whereupon the liquid held in the flotation member is allowed to drop therefrom into the receptacle 14. So relieved of its weight of contained liquid the flotation member begins to rise in the tank 10, opening outlet 12 and entrance 26. Flow from the main body of liquid accordingly takes place simultaneously through outlet 12 to replenish the supply in receptacle 15 and through entrance 26 to restore the flotation member to a weighted condition. Liquid entering part 24 displaces air therefrom, which displaced air is vented through the open upper end of tube 18 and discharged through the bottom of the tube into the enclosed space beneath outlet 12. The parts are so proportioned, constructed and arranged, it will be understood, that a quantity of liquid substantially as indicated in FIG. 1 within the part 24 is sufficient to sink the flotation member, the operation of elevating the flotation member, admitting liquid thereto and sinking the member occurring in such predetermined timed relation to the rate of flow from tank 10 through outlet 12 as to coincide substantially with the filling of receptacle 14. Closing of the valve 25 upon the outlet 12 finds the interior of part 24 filled with liquid to an extent as indicated in FIG. 1 with a continuous liquid column extending downward through outlet 12 and extension 15 into the receptacle 14. The chamber 29 above such liquid column is sealed and the entrance of air thereto by way of tube 18 is precluded by virtue of the lower end of this tube being itself immersed in liquid. Conditions accordingly are such that atmospheric pressure upon the surface of the liquid in receptacle 14 balances the weight of the described liquid column. Accordingly the part 24 remains filled or partly filled with an amount of liquid sufficient to maintain the flotation member in its lowermost position closing outlet 12 until such time as a falling level in the receptacle 14 exposes the lower end of extension 15 to the atmosphere.

The frusto-conical shape of the outlet extension 15 provides an interior volume approximately equal to the volume in part 24 required to be filled to sink the flotation member. The chamber 29 has a diameter approximately equal to the outlet 12 and the upper end thereof projects above the liquid level in tank 10 in any longitudinal position of adjustment.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a device of the kind described, a storage tank for matter in a fluid state having an outlet at the lower end thereof, a receptacle spaced vertically below said storage tank to receive matter therefrom by gravity flow through said outlet, flotation means in said tank, means guiding said flotation means for reciprocable raising and lowering motions in line with said outlet, a valve on said flotation means adapted to seat on and close said outlet in a lowered position of said flotation means, said flotation means having a hollow interior and being formed with a single opening communicating such interior with said receptacle through said outlet in a lowered position of the flotation means and communicating such interior with the storage tank in an elevated position of the flotation means, and means venting the interior of said flotation means dependent from an intermediate point therein through said tank outlet, admission of air therethrough inducing a raising of said flotation means in said tank.

2. In a device of the kind described, a liquid storage tank having an outlet at the lower end thereof, a receptacle beneath said storage tank to receive liquid therefrom by gravity flow through said outlet, a downward extension from said outlet into said receptacle terminating in spaced relation to the bottom of said receptacle, flotation means in said storage tank having a hollow interior and an opening at its lower end to register with said outlet, a valve on said flotation means in surrounding relation to said opening and adapted to seat on and close said outlet, and a vent connection from an intermediate point in the interior of said flotation means to a point outside said tank intermediate said outlet and the bottom of said outlet extension, said flotation means being made buoyant by the admission of air thereto around the bottom of said extension whereby to rise in said tank and open said valve, liquid from said tank flowing simultaneously from said outlet and into said flotation means until the loss of buoyancy of said flotation means releases said valve, liquid trapped in said flotation means holding said valve closed until the liquid level in said receptacle drops below the bottom of said outlet extension.

3. In a device of the kind described, an open receptacle, a liquid storage tank in overlying relation to said receptacle and having an outlet in its bottom for gravity flow into the receptacle, a flotation member in said tank adapted to seat on and close said outlet, said flotation member having a hollow interior and an opening to register with said outlet, said member having an elevated position in which liquid from said tank may flow out of the tank by way of said outlet and further has access to the interior of said member by way of said opening therein, said member being weighted thereby and descending to close said outlet, an extension from said outlet downward into said receptacle, said extension precluding access of air to said outlet until the liquid level in said receptacle falls below the lower end of said extension, such access enabling a drain of liquid from said flotation member and an increase thereby in the buoyancy of said member causing it to rise to said elevated position, and a vent from the interior of said flotation member to the space below said outlet enclosed by said extension.

4. A device according to claim 3, characterized in that said vent is in the form of a tube stationarily mounted in said tank to project vertically through said outlet, said tube providing a sliding mount for said flotation member.

5. A device according to claim 3, characterized in that said outlet extension has a configuration expanded relative to said outlet defining an enclosed volume approximately equal to an interior volume of said flotation member which when liquid filled will sink said member, there being in said member additional interior space forming an air chamber.

6. A device according to claim 3, characterized in that said flotation member is formed with a bulbous lower portion to receive liquid from said tank and a tubular upper portion defining an air chamber, said tubular portion projecting above the maximum liquid level in said tank.

7. In a device of the kind described, a storage tank for fluid matter having an outlet at the lower end thereof for gravity flow of the matter from the tank, vertically spaced receptacle means supplied from said tank through said outlet, dependent discharge means defining said outlet to one end and having its remote end within the receptacle, flotation means in said tank including valve means adapted to close said outlet, and means within said discharge means providing a vent to said flotation means for communicating air with said flotation means to open the valve means as the level of fluid matter in said receptacle falls below said remote end of said discharge means.

8. Apparatus for use with a storage tank for fluid matter having an outlet at its lower end for flow therefrom to a receptacle spaced therebelow, including flotation means for positioning in the tank providing means adapted to close its outlet, means for providing a channeled discharge from said outlet to a point within the receptacle spaced from its bottom, and tubular means adapted to open to opposite ends respectively within said flotation means and from said discharge means and provide an operative connection between said flotation and discharge means, said flotation means mounting to be freely adjustable relative said tubular means whereby to adapt it to selectively seal said tank outlet when the level of the fluid matter in the receptacle seals said discharge means and to open the outlet when the level of fluid in the receptacle falls below said discharge means to admit air through said tubular means to said flotation means.

9. In a device of the kind described, a storage tank for fluid matter having an opening to its lower end and receptacle means therebelow, means defining said opening to one end and having its other end projected to a point within said receptacle means spaced from its bottom arranged to provide for discharge of the fluid matter from said opening to said receptacle means under the influence of gravity, a float in said tank having means defining a single opening adapted to seal said tank opening and establish the interior of the float in communication with said discharge means when the level of the fluid matter in said receptacle means rises above the end of the channel means within said receptacle means, said float being responsive to the level of the fluid matter in the receptacle means falling below said channel means to admit said air thereto to rise in said tank and open said opening therefrom.

10. Apparatus, for use in conjunction with a storage tank having an outlet at its lower end for flow of matter therefrom to a receptacle spaced therebelow, including a hollow housing having a single opening providing a buoyant unit adapted to be positioned in the tank over its outlet, means for providing a channeled discharge of matter flowing from said outlet to a point within the receptacle spaced from its bottom, and tubular means open to opposite ends adapted to have one open end project in said housing through its opening and bearingly support said housing for relatively free movement vertically thereof to and from a position closing the tank outlet and have its other open end arranged to open from said discharge means whereby said housing will selectively seal the tank outlet when the level of fluid matter in the receptacle is such to seal said discharge means and open the outlet when the level of fluid matter in the receptacle falls below said discharge means to provide for admission of air through said tubular means to said housing.

References Cited in the file of this patent

UNITED STATES PATENTS

| | | |
|---|---|---|
| 1,161,958 | Olson | Nov. 30, 1915 |
| 2,352,373 | Eash | June 27, 1944 |